US012221925B1

(12) United States Patent
O'Brien

(10) Patent No.: US 12,221,925 B1
(45) Date of Patent: Feb. 11, 2025

(54) PASSIVE BYPASS FOR MITIGATION OF INLET BUZZ IN SUPERSONIC OR HYPERSONIC AIR-BREATHING ENGINES

(71) Applicant: Raytheon Company, Tewksbury, MA (US)

(72) Inventor: Timothy O'Brien, Vail, AZ (US)

(73) Assignee: Raytheon Company, Arlington, VA (US)

( * ) Notice: Subject to any disclaimer, the term of this patent is extended or adjusted under 35 U.S.C. 154(b) by 0 days.

(21) Appl. No.: 18/635,986

(22) Filed: Apr. 15, 2024

(51) Int. Cl.
| | | |
|---|---|---|
| F02C 7/04 | (2006.01) |
| B64D 33/02 | (2006.01) |
| F02C 7/045 | (2006.01) |
| F02C 7/057 | (2006.01) |
| F02C 7/24 | (2006.01) |
| F02K 1/82 | (2006.01) |
| F02K 7/10 | (2006.01) |
| F02K 7/14 | (2006.01) |
| F02K 7/18 | (2006.01) |

(52) U.S. Cl.
CPC ............... *F02C 7/04* (2013.01); *B64D 33/02* (2013.01); *F02C 7/045* (2013.01); *F02C 7/057* (2013.01); *F02C 7/24* (2013.01); *F02K 1/82* (2013.01); *F02K 7/10* (2013.01); *F02K 7/105* (2013.01); *F02K 7/14* (2013.01); *F02K 7/18* (2013.01); *B64D 2033/0206* (2013.01); *B64D 2033/0226* (2013.01); *B64D 2033/026* (2013.01); *F05D 2220/10* (2013.01); *F05D 2260/606* (2013.01)

(58) Field of Classification Search
CPC ............ B64D 33/02; B64D 2033/0206; B64D 2033/0226; B64D 2033/026; F02C 7/04; F02C 7/045; F02C 7/057; F02K 1/82; F02K 7/10; F02K 7/105; F02K 7/14; F02K 7/18
See application file for complete search history.

(56) References Cited

U.S. PATENT DOCUMENTS

| | | | | |
|---|---|---|---|---|
| 2,920,446 A | * | 1/1960 | Ranard | F02C 7/057 73/147 |
| 3,011,307 A | * | 12/1961 | Edelfelt | F02C 7/042 137/15.1 |
| 3,430,640 A | | 3/1969 | Lennard | |

(Continued)

*Primary Examiner* — Kyle Robert Thomas
(74) *Attorney, Agent, or Firm* — Schwegman Lundberg & Woessner, P.A.

(57) ABSTRACT

A passive bypass for an inlet to a supersonic or hypersonic air-breathing engine allows airflow in the inlet to exit through the cowling when the inlet supplies more airflow than the air-breathing engine demands. The air-breathing engine may be the only form of propulsion or a secondary form of propulsion to reach higher speeds. The passive bypass includes a plurality of lower channels in the cowling that are operatively coupled to the inlet diffuser at an inner surface of the cowling and swept forward towards the throat, a plenum in the cowling operatively coupled to the plurality of lower openings and a plurality of upper channels in the cowling that are operatively coupled to the plenum and swept back away from the throat to an outer surface of the cowling. A serpentine path through the plurality of lower openings, the plenum and the plurality of upper openings allows airflow in the inlet to exit through the cowling when the inlet supplies more airflow than the air-breathing engine demands.

19 Claims, 12 Drawing Sheets

(56) References Cited

U.S. PATENT DOCUMENTS

| | | | | |
|---|---|---|---|---|
| 3,460,554 A | * | 8/1969 | Johnson | F02C 7/057 |
| | | | | 137/15.2 |
| 3,477,455 A | | 11/1969 | Campbell | |
| 3,799,475 A | * | 3/1974 | Mitchell | F02C 7/057 |
| | | | | 137/15.1 |
| 4,007,891 A | * | 2/1977 | Sorensen | B64D 33/02 |
| | | | | 137/15.1 |
| 4,381,017 A | * | 4/1983 | Bissinger | B64D 33/02 |
| | | | | 137/15.1 |
| 4,463,772 A | * | 8/1984 | Ball | B64D 33/02 |
| | | | | 137/15.2 |
| 4,620,679 A | * | 11/1986 | Karanian | B64D 33/02 |
| | | | | 137/15.1 |
| 8,286,434 B2 | | 10/2012 | Henne et al. | |
| 10,190,539 B2 | | 1/2019 | Bowcutt et al. | |
| 2011/0062290 A1 | | 3/2011 | Chase et al. | |

\* cited by examiner

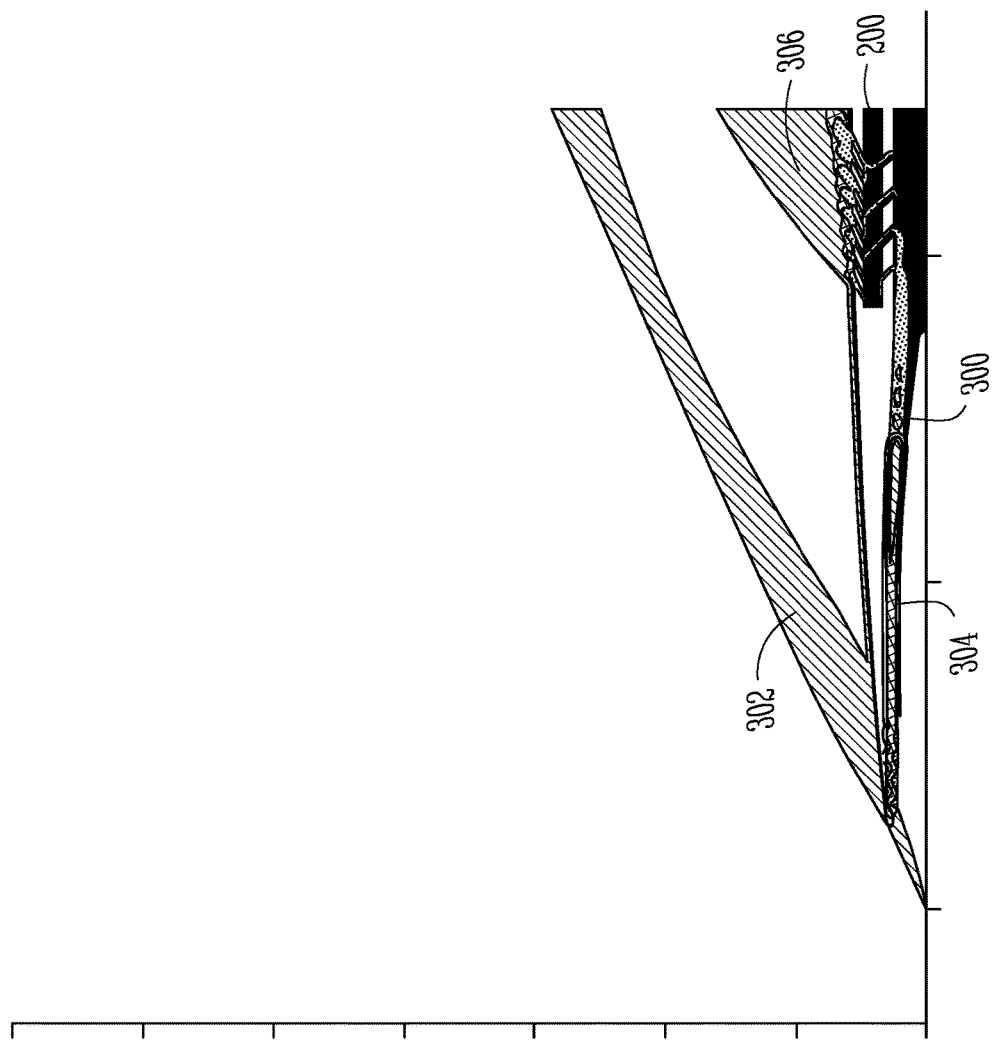

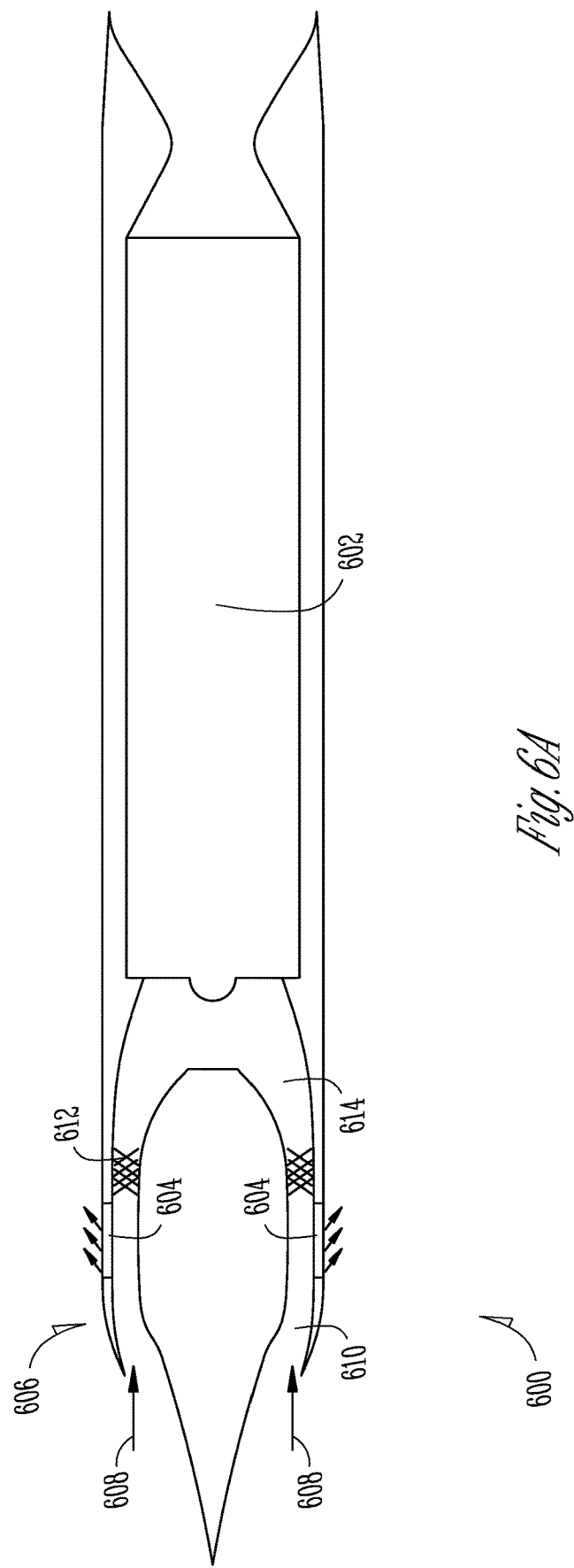

PASSIVE BYPASS FOR MITIGATION OF INLET BUZZ IN SUPERSONIC OR HYPERSONIC AIR-BREATHING ENGINES

GOVERNMENT LICENSE RIGHTS

This disclosure was made with government support under AMTC-19-03-0777 awarded by the United States Army. The government has certain rights in this invention.

BACKGROUND

Field

This disclosure relates to supersonic or hypersonic air-breathing engines, and more particularly to the mitigation of inlet buzz.

Description of the Related Art

Supersonic or hypersonic vehicles are vehicles, such as aircraft, missiles, space planes, airplanes, drones, etc., capable of traveling at supersonic or hypersonic speeds. As used herein, hypersonic is considered speeds above Mach 5, supersonic is considered speeds above Mach 1, and subsonic is considered speeds below Mach 1. Mach number compares the speed of the vehicle to the speed of sound.

Supersonic and hypersonic vehicles may use some type of air-breathing engine, such as a ramjet or scramjet engine, or a gas turbine engine, as the means of propulsion. A ramjet or scramjet engine is an air-breathing jet engine in which combustion takes place after being compressed by an inlet in an incoming supersonic airflow. These engines rely on high vehicle speed to forcefully contract the incoming supersonic air before combustion. The ramjet/scramjet engine may require a rocket booster engine to get the vehicle up to speed before the ramjet or scramjet can take over. A gas turbine engine may be the only source of propulsion, operating from system launch up to supersonic cruising speeds.

A typical ramjet/scramjet engine is composed of three basic components: an inlet converging to a minimum area throat followed by a diffuser, where incoming air is contracted; a combustor, where fuel is burned with the incoming air to produce heat and increase resulting combustion product pressure; and a diverging nozzle, where the hot exhaust gas is accelerated to produce thrust. The inlet may be a 2D inlet having a generally rectangular cross-section or a 3D inlet having either a generally annular cross section or an arbitrary shape.

In a rocket-boosted vehicle, for a period of time during acceleration, the speed of the vehicle will be too low for the engine inlet to ingest all oncoming airflow. If the flow approaching the inlet at a given supersonic speed, pressure, temperature, and angle of attack, cannot all pass through the inlet, a strong shockwave system will form in front of the inlet, reducing the flow speed and spilling a fraction of the oncoming air flow around the inlet. This creates a large inlet drag. The strong shockwave also separates the airflow boundary layer at the wall, creating a violently unsteady and noisy inlet flow behavior called "inlet buzz." The same problem can be encountered when the hypersonic vehicle decelerates, such as upon descent to target impact for a missile.

Inlet buzz is depicted for a boosted vehicle in which the inlet has no shroud covering the inlet in FIGS. 1A-1D that represent a time series of snapshots of airflow speed within an inlet 100 and outside a cowling 102 during the boost phase prior to the air-breathing engine becoming operational. Inlet 100 includes a throat 104 and a diffuser 106. During the boost phase, a port cover is positioned to close the aft end of diffuser 106 and block all airflow into the combustion chamber.

As shown in FIG. 1A, in a fully started inlet with the airflow going left-to-right, the aft end is instantly closed by the port cover. A shock wave 108 begins propagating upstream at a boundary inside the diffuser. An airflow 110 flows smoothly in front of the inlet and around the cowling. As shown in FIG. 1B, shock wave 108 has propagated to the throat 104 and is about to vent to the atmosphere. As shown in FIG. 1C, shock wave 108 has blasted out of the inlet and propagated all the way to the nose of the vehicle. The previously smooth airflow 110 in front of the vehicle is now both highly distorted and intermittent. At this point shock wave 108 oscillates back-and-forth in the inlet. The pressure inside the diffuser 106 eventually lowers in magnitude to a point that the oscillations dissipate and the shock wave in front of the inlet begins to be ingested and move aft through the diffuser. As shown in FIG. 1D, the shock wave has been swallowed by the inlet. The airflow 110 external to the cowling is settling back into a smooth flowfield. Inside the inlet, airflow 112 is rushing aft towards the port cover at the end of the diffuser. The airflow 112 reflects off the closed port cover. A new shock wave 108 forms and starts propagating upstream and the cycle repeats.

For a 2D inlet, one current approach to avoid inlet buzz and unstart is to mechanically close the inlet with a rotating cowl flap until ready to start the engine, at which time the inlet flap is rotated open. Another approach is the use of bypass doors in the inlet that divert a portion of the oncoming airflow into separate channels that exhaust the airflow into a low-pressure region of the vehicle. Another approach is to use a fairing or shroud to cover the inlet during the boost phase.

For a 3D inlet an approach is to cover the inlet with a fairing or shroud that is ejected from the vehicle just prior to starting the air-breathing engine. However, once the fairing or shroud is ejected, there is nothing to protect the air-breathing engine when the vehicle decelerates. U.S. Pat. No. 10,190,539 entitled "Inlet Flow Restrictor" discloses a flow restrictor that is movable between a stowed position and a fully deployed positioned. The flow restrictor's cross-sectional area is less than that of the cowling such that a consistent gap is formed between a periphery of the flow restrictor and an inner surface of the cowling.

In a supersonic vehicle in which the air-breathing engine is the only form of propulsion e.g., a gas turbine engine, during normal operation a stable shock wave is established in the diffuser. If the shock wave is disturbed and moves forward through the throat inlet buzz may occur.

SUMMARY

The following is a summary that provides a basic understanding of some aspects of the disclosure. This summary is not intended to identify key or critical elements of the disclosure or to delineate the scope of the disclosure. Its sole purpose is to present some concepts of the disclosure in a simplified form as a prelude to the more detailed description and the defining claims that are presented later.

The present disclosure provides a passive bypass for an inlet to a supersonic or hypersonic air-breathing engine that allows airflow in the inlet to exit through the cowling when the inlet supplies more airflow than the air-breathing engine demands. The air-breathing engine may be the only form of propulsion or be a secondary form of propulsion to reach higher speeds.

In an embodiment, the passive bypass includes a plurality of lower channels in the cowling that are operatively coupled to the inlet diffuser at an inner surface of the cowling and swept forward towards the throat, a plenum in the cowling operatively coupled to the plurality of lower openings and a plurality of upper channels in the cowling that are operatively coupled to the plenum and swept back away from the throat to an outer surface of the cowling. A serpentine path through the plurality of lower openings, the plenum and the plurality of upper openings allows airflow in the inlet to exit through the cowling when the inlet supplies more airflow than the air-breathing engine demands.

In an embodiment, the plurality of lower channels are swept forward at an angle greater than 90 degrees with respect to the airflow in the inlet such that the airflow makes a hard turn at a sharp corner, the plenum is configured to cause the airflow from the plurality of lower openings to decelerate and flow in a counter-clockwise direction, and the plurality of upper channels are swept backward at an angle greater than 90 degrees with respect to the airflow in the inlet such that the counter-clockwise flow in the plenum makes another hard turn at a sharp corner before exiting to the atmosphere in an aft direction.

In an embodiment, the number of lower channels is less than the number of upper channels and the area of an individual lower channel is less than the area of an individual upper channel. The lower and upper channels may be configured such that the total area of the lower and upper channels is approximately equal.

In an embodiment, the inlet is unshrouded. The passive bypass negates the need for a shroud.

In an embodiment, the air-breathing engine is accompanied by a boost engine that gets the flight vehicle up to speed. When the air-breathing engine is off, supersonic airflow into the inlet produces a shock wave that is established in the diffuser. All subsequent airflow entering the inlet is diverted forward through the lower openings into the plenum where the pressure is reduced and then directed aft out of the plurality of upper openings into the atmosphere. When the air-breathing engine is on, a serpentine path through the plurality of lower openings, the plenum and the plurality of upper openings limits the amount of airflow that leaks out of the cowling. This is a typical configuration for a hypersonic boost vehicle.

In an embodiment, the air-breathing engine is the sole source of propulsion. During normal operation, supersonic airflow into the inlet produces a shock wave that is established in the diffuser aft of the passive bypass such that an amount of airflow that leaks out through the passive bypass is limited. If the shock wave is disturbed and moves forward toward the throat, airflow entering the inlet is diverted forward through the lower openings into the plenum where the pressure is reduced and then directed aft out of the plurality of upper openings into the atmosphere to prevent the shock wave from reaching the throat. This is a typical configuration for a supersonic flight vehicle with a gas turbine engine.

These and other features and advantages of the disclosure will be apparent to those skilled in the art from the following detailed description of preferred embodiments, taken together with the accompanying drawings, in which:

BRIEF DESCRIPTION OF THE DRAWINGS

FIGS. 4A-4C illustrate a time sequence of snapshots of airflow speed through the inlet and the passive bypass and around the cowling during the boost phase;

FIGS. 6A-6B illustrate a flight vehicle in which the only form of propulsion is the air-breathing engine in which a passive bypass formed in the cowling diverts airflow through the cowling if the shockwave is disturbed.

DETAILED DESCRIPTION

A passive bypass for an inlet to a supersonic or hypersonic air-breathing engine allows airflow in the inlet to exit through the cowling when the inlet supplies more airflow than the air-breathing engine demands. The air-breathing engine may be the only form of propulsion or a secondary form of propulsion to reach higher speeds. The passive bypass includes a plurality of lower channels in the cowling that are operatively coupled to the inlet diffuser at an inner surface of the cowling and swept forward towards the throat, a plenum in the cowling operatively coupled to the plurality of lower openings and a plurality of upper channels in the cowling that are operatively coupled to the plenum and swept back away from the throat to an outer surface of the cowling. A serpentine path through the plurality of lower openings, the plenum and the plurality of upper openings allows airflow in the inlet to exit through the cowling when the inlet supplies more airflow than the air-breathing engine demands.

Figure 2:
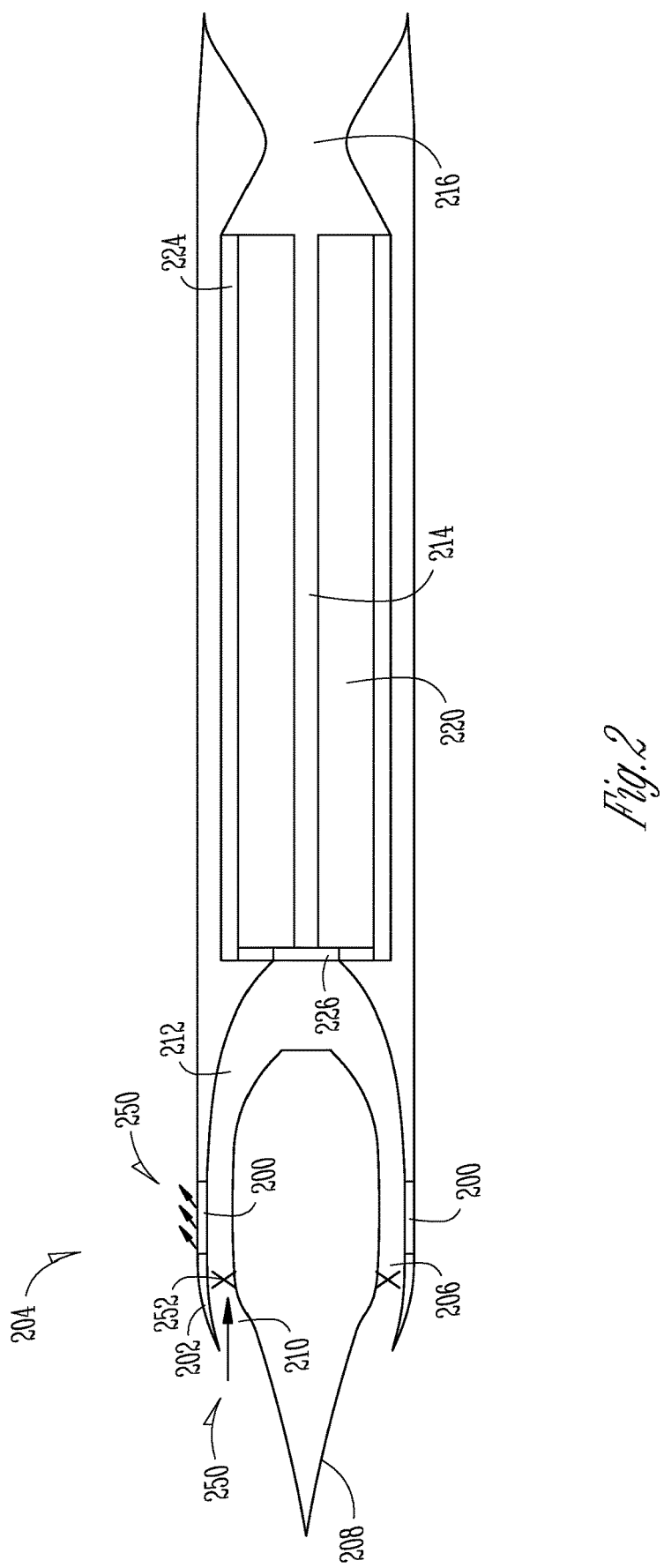
FIG. 2 illustrates a flight vehicle including a rocket booster motor and a solid fuel ramjet during a boost phase in which a passive bypass formed in the cowling that defines the inlet diverts all of the airflow through the cowling during the boost phase.
Figure 3:
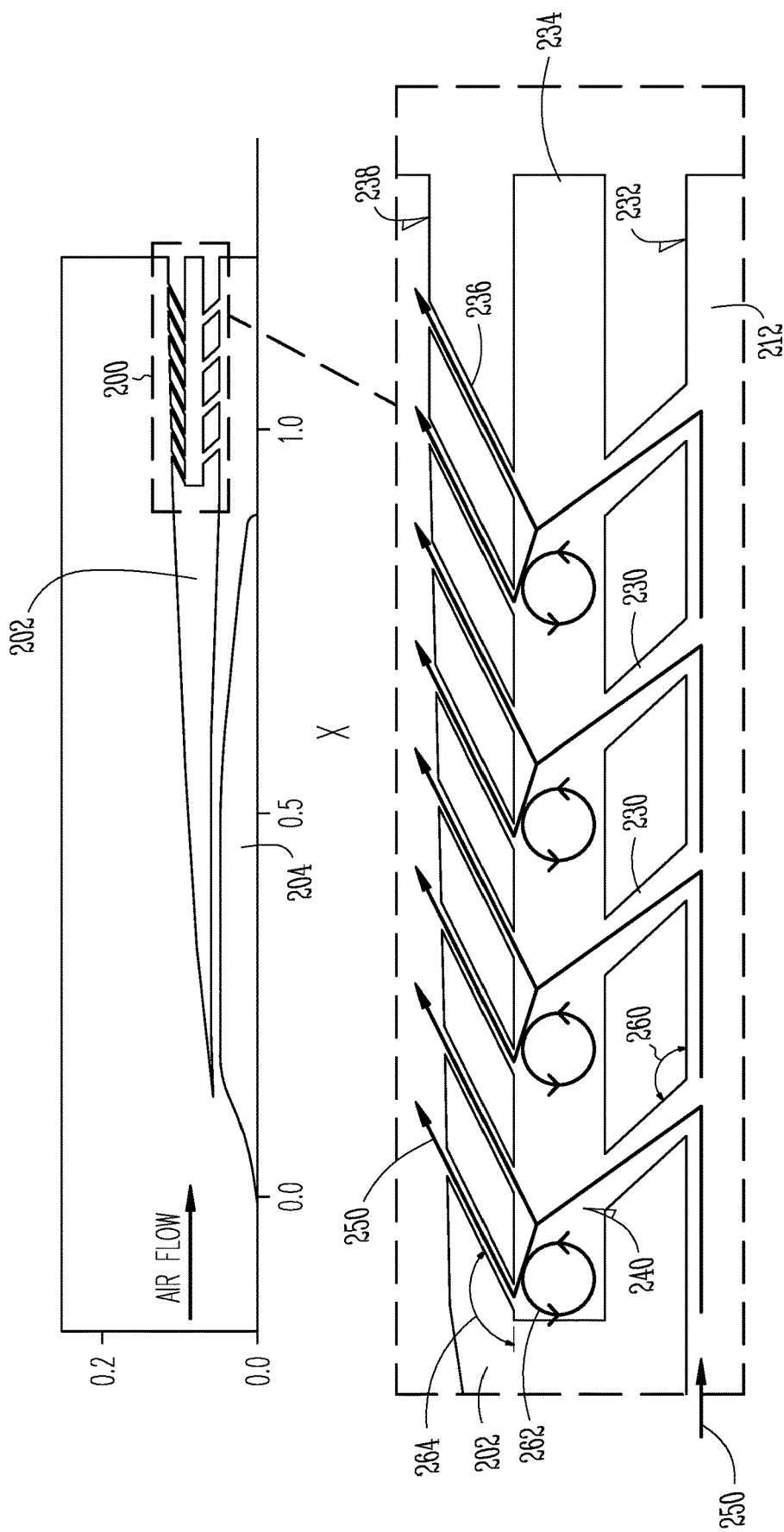
FIG. 3 is a section view of an embodiment of a passive bypass formed in the engine cowling.

Referring now to FIGS. 2 and 3, an embodiment of a passive bypass 200 is formed in a cowling 202 of a boosted flight vehicle 204 (e.g., a supersonic or hypersonic missile) as shown during the boost phase. An annular inlet 206 is formed between a vehicle body 208 and the cowling 202. Inlet 206 includes a throat 210 and a diffuser 212. The aft end of the diffuser is coupled to a combustion chamber 214, which in turn is coupled to a converging/diverging nozzle 216. A booster engine includes a rocket booster grain 220 positioned within the combustion chamber 214. An air-breathing engine includes a solid fuel ramjet grain 224 positioned around the rocket booster grain 220 within the combustion chamber 214. During boost phase, a port cover 226 is closed to seal off the back end of diffuser 212. The rocket booster grain 220 is ignited and burns to completion to get the flight vehicle 204 up to a speed at which the air-breathing engine can operate.

Passive bypass 200 includes a plurality of lower channels 230 in the cowling that are operatively coupled to the inlet diffuser 212 at an inner surface 232 of the cowling and swept forward towards the throat, a plenum 234 in the cowling operatively coupled to the plurality of lower openings and a plurality of upper channels 236 in the cowling that are operatively coupled to the plenum and swept back away from the throat to an outer surface 238 of the cowling. A serpentine path 240 through the plurality of lower openings, the plenum and the plurality of upper openings allows airflow 250 in the inlet to exit through the cowling when the inlet supplies more airflow than the air-breathing engine demands.

The channels represent some form of opening formed in the cowling that allows the airflow 250 to flow from the diffuser 212 through the channels 230 and 236 and plenum 234 and out to the atmosphere. The channels may be, for example, slots formed in the cowling, a series of holes or porous material.

In general, passive bypass 200 allows airflow in the inlet to exit through the cowling when the inlet supplies more airflow than the air-breathing engine demands. During the boost phase, the port cover is closed and the air-breathing engine demands no airflow.

The plurality of lower channels 230 are swept forward at an angle 260 greater than 90 degrees with respect to the airflow 250 in the inlet such that the airflow makes a hard turn at a sharp corner, the plenum 234 is configured to cause the airflow 250 from the plurality of lower openings to decelerate and flow in a counter-clockwise direction 262, and the plurality of upper channels are swept backward at an angle 264 greater than 90 degrees with respect to the airflow in the inlet such that the counter-clockwise flow in the plenum makes another hard turn at a sharp corner before exiting to the atmosphere in an aft direction.

In an embodiment, the number of lower channels 230 is less than the number of upper channels 236 and the area of an individual lower channel 230 is less than the area of an individual upper channel 236. The lower and upper channels may be configured such that the total area of the lower and upper channels is approximately equal. The number and size of the lower and upper channels depend on the overall design of the flight vehicle and booster and air-breathing engine, which dictates the amount of airflow that is being ingested by the inlet.

In an embodiment, the inlet is unshrouded. The passive bypass 200 negates the need for a shroud.

During the boost phase, the air-breathing engine is off, and the supersonic airflow 250 into the inlet produces a shock wave 252 that is established in the diffuser 212. All subsequent airflow 250 entering the inlet is diverted forward through the lower openings 230 into the plenum 234 where the pressure is reduced and then directed aft out of the plurality of upper openings 236 into the atmosphere.

The shock wave 252 sits in the diffuser upstream of the passive bypass 200. Because relatively slow air is flowing over the passive bypass 200 (less than supersonic), the airflow does not need to turn very aggressively through the lower channels, which allows the lower channels to be effectively much larger openings to allow airflow to go into the plenum. Because of the substantially lower pressure loss through the lower channels, there is a sufficiently high-pressure differential between the plenum and the freestream that the air flow has an easier time escaping through the outer cowling.

Figure 4A:
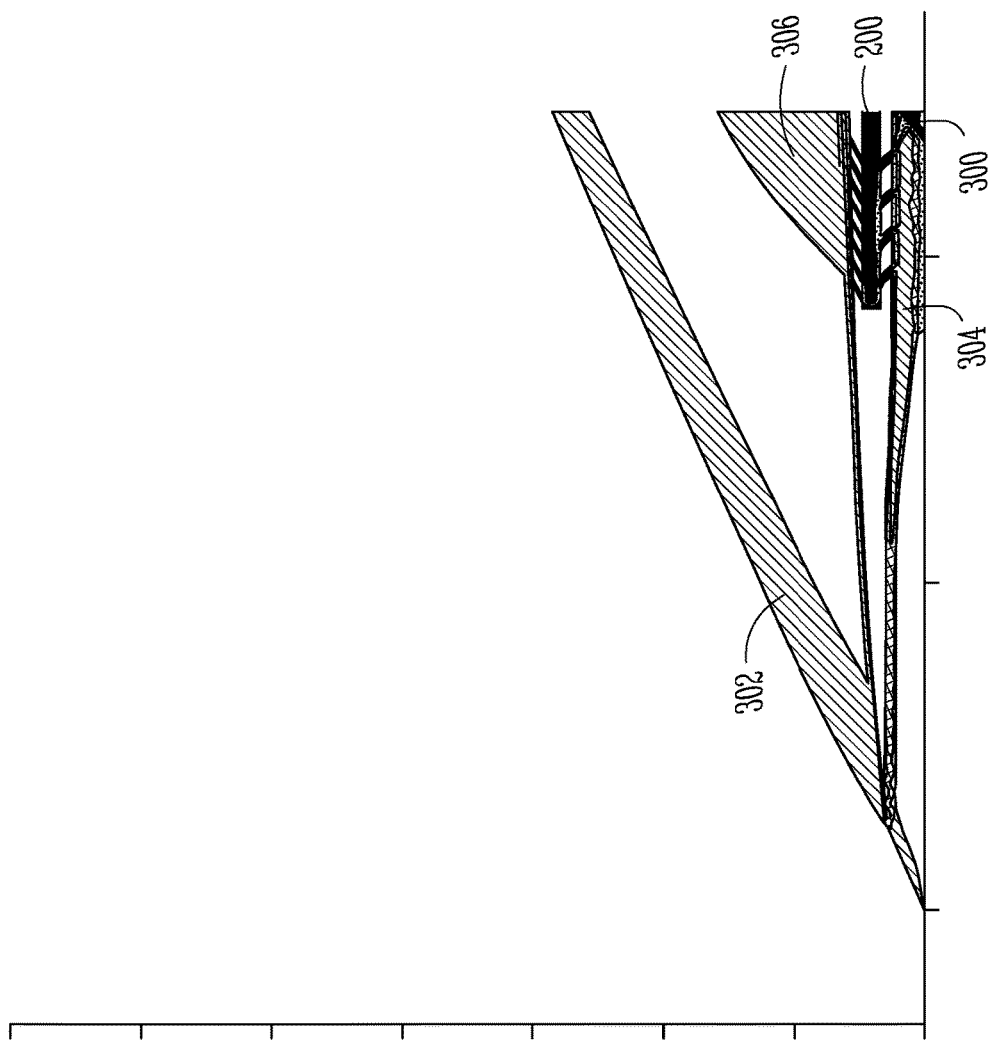
Figure 4B:
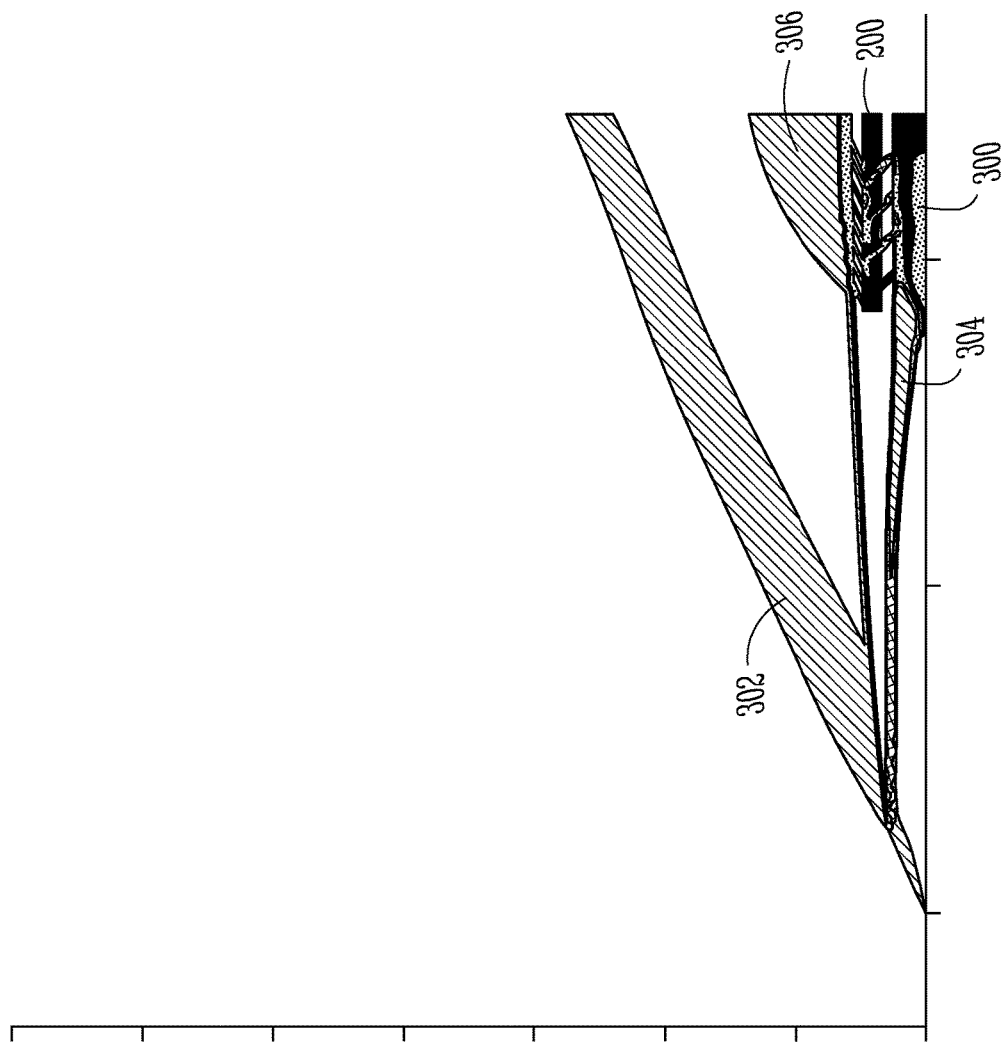

The mitigation of inlet buzz using the passive bypass 200 is depicted in FIGS. 4A-4C that represent a time series of snapshots of airflow speed within inlet 206 and outside cowling 202 during the boost phase prior to the air-breathing engine becoming operational.

As shown in FIG. 4A, in a fully started inlet with the airflow going left-to-right, the aft end is instantly closed by the port cover. A shock wave 300 begins propagating upstream at a boundary inside the diffuser. An airflow 302 flows smoothly in front of the inlet and around the cowling. A small amount of airflow 304 into the inlet escapes through passive bypass 200 as leakage airflow 306. As shown in FIG. 4B, shock wave 300 has just passed in front of passive bypass 200. The pressure differential between diffuser 212 and external airflow in the atmosphere pushes additional airflow 304 through passive bypass 200 to increase the leakage airflow 306 to the point that the external airflow 302 is disrupted. As shown in FIG. 4C, shock wave 300 stabilizes in the diffuser and stops moving. Pressure rise from the shock system creates a sufficient pressure differential that all of the airflow 304 is diverted through passive bypass 200 into the atmosphere. This produces a substantial change in airflow 302.

Figure 1A:
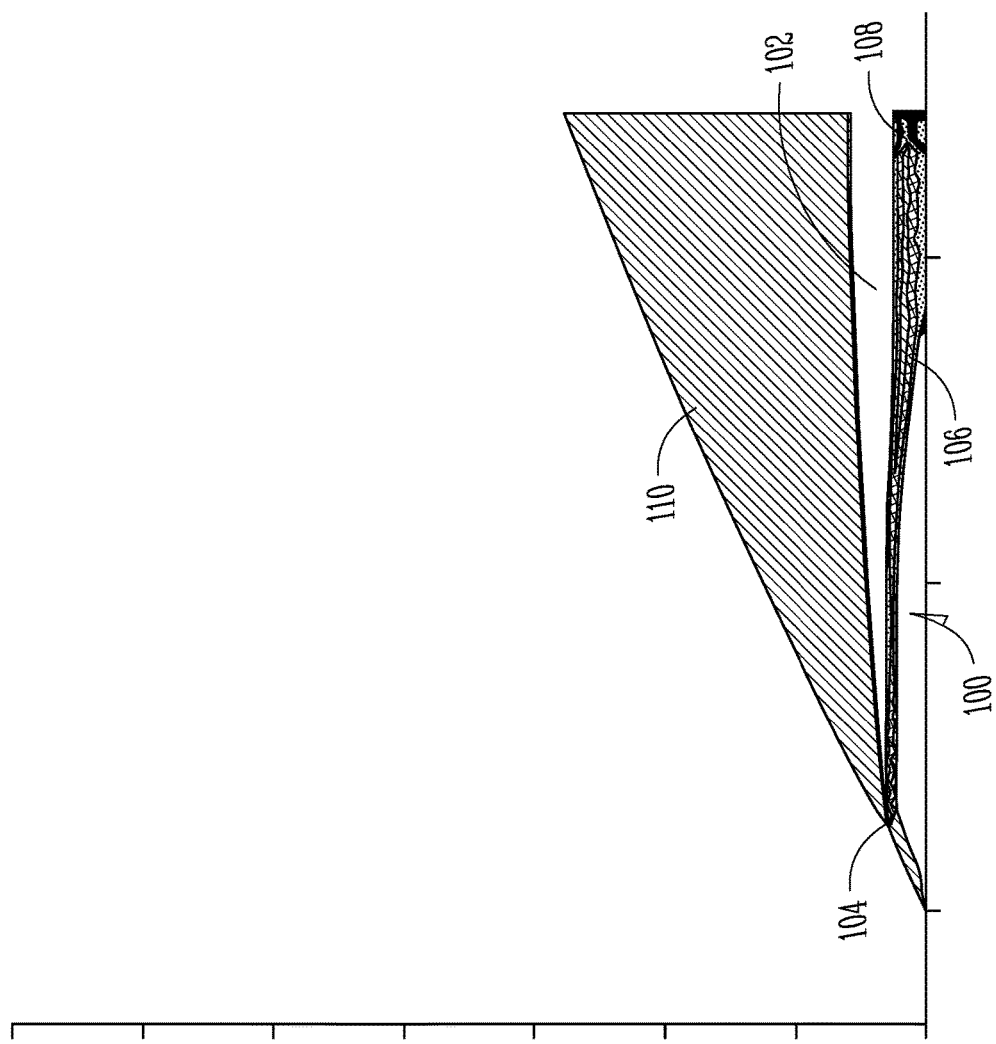
FIGS. 1A-1D, as described above, illustrate a time sequence of snapshots of airflow speed through the inlet and around the cowling during the boost phase before the air-breathing engine is operating.
Figure 1B:
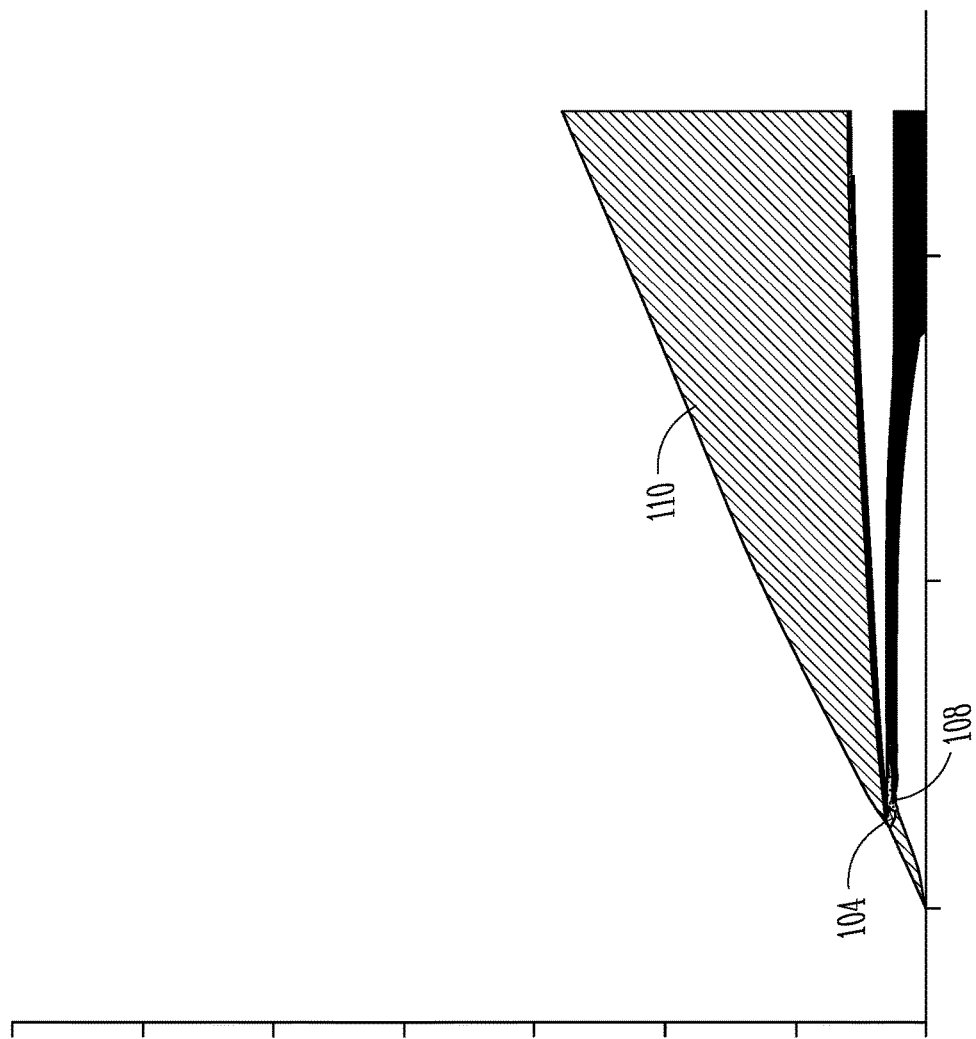
Figure 1C:
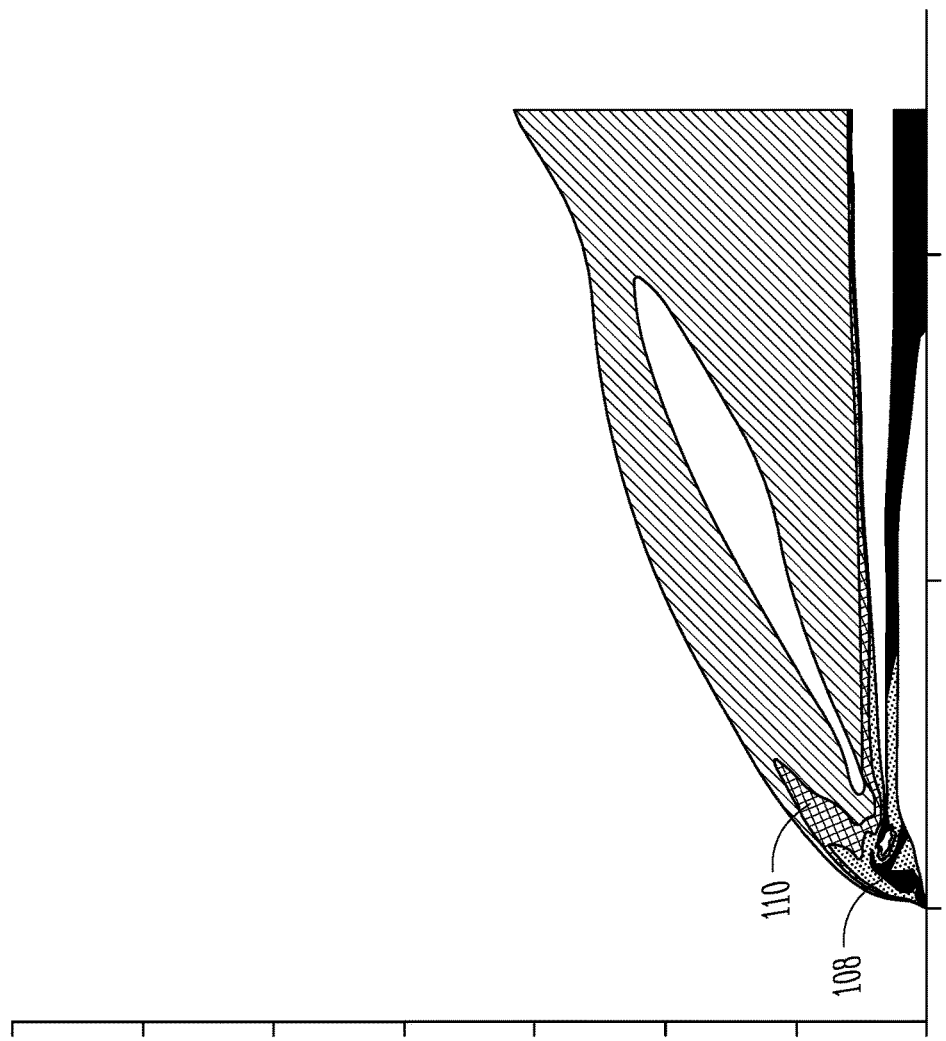
Figure 1D:
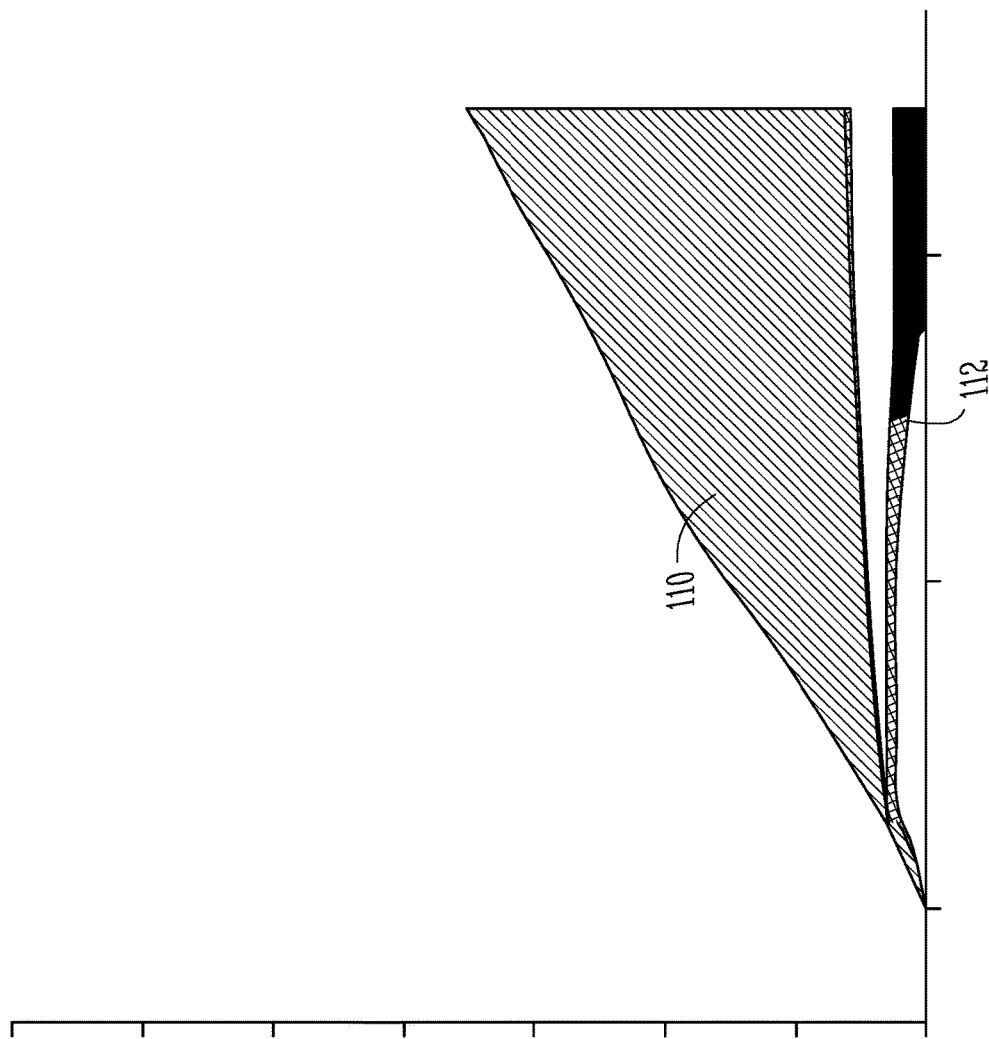

In comparing, FIG. 4C that illustrates diversion of all incoming airflow into the inlet through the passive bypass into the atmosphere and FIG. 1C in which the airflow is forced back out of the throat, it is readily apparent that the passive bypass greatly reduces the disruption of the smooth airflow over the cowling, and most importantly essentially eliminates any such disruption at the inlet throat.

Figure 5:
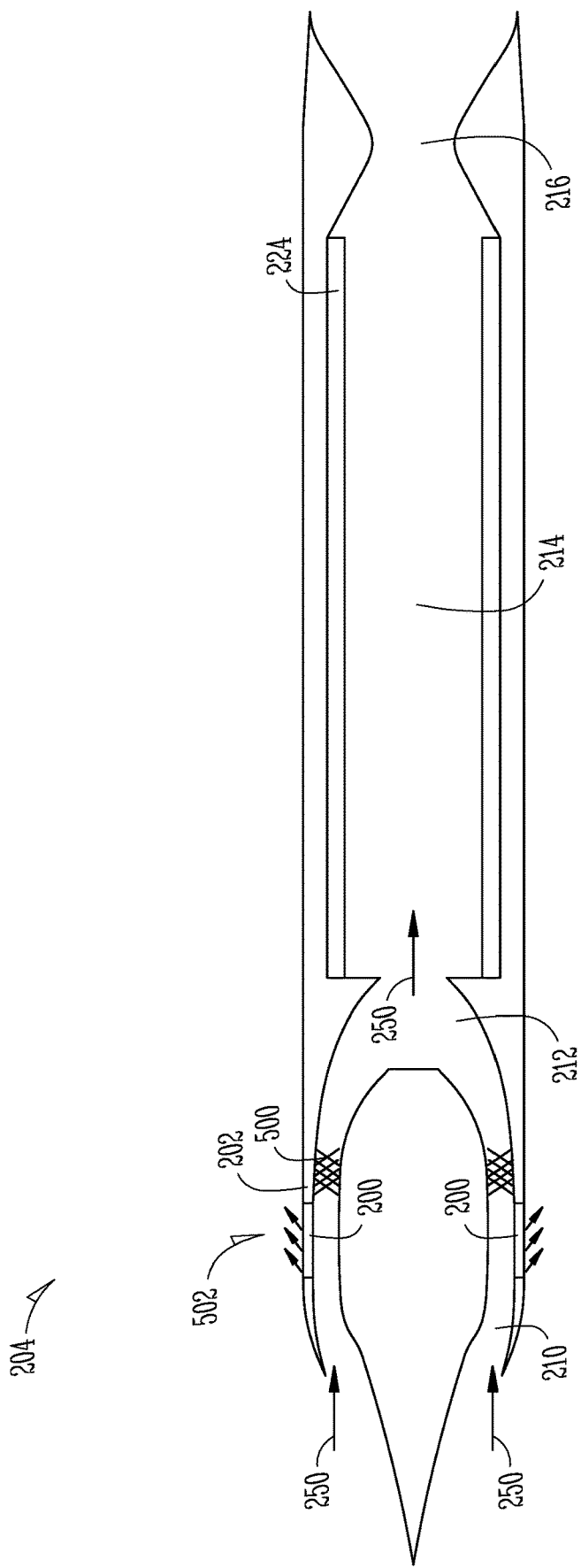
FIG. 5 illustrates the limited leakage of airflow through the cowling during the ramjet phase.

As shown in FIG. 5, when the flight vehicle 204 transitions from the boost phase to the ramjet phase, the port cover is opened, airflow 250 is allowed to pass through the inlet into combustion chamber 214 where it is ignited with the solid fuel ramjet grain 224 and the gasses exhausted through converging/diverging nozzle 216 to propel the flight vehicle to higher speeds. The pressure rise in the combustion chamber causes a shock train 500 to form in the diffuser 212. The diffuser allows the shock train 500 to move back-and-forth in the diffuser without affecting airflow coming into the chamber. The high loss serpentine path through the plurality of lower openings, the plenum and the plurality of upper openings that form passive bypass 200 limits the amount of airflow 250 that passes through the cowling as a leakage airflow 502. Ideally, the leakage airflow 502 would be zero when the air-breathing engine is active. However, a small leakage airflow 502 is more than offset by the reduction in the disruption of the external airflow during the boost phase.

Airflow in the diffuser is supersonic and predominantly going left to right, and if positioned correctly, sits upstream of the shock train that pressurizes the flow going into the engine. To go through the passive bypass, the airflow must make a hard turn over a sharp corner to enter the lower channels, which induces a shock pressure loss and a flow separation that reduces the opening of the forward swept lower channels. Once airflow passes through the lower channels, it expands into the plenum. The plenum acts to force the airflow to quickly slow down, incurring further losses. The flow exiting the inner channels tends to hit the upper wall of the plenum, forcing the flow to spread out as it is decelerating. While in the plenum, the airflow is generally going in a counter-clockwise direction, heading upstream along the upper wall of the plenum. This flow then passes through the upper channels, where again the flow needs to make a hard turn over a sharp corner. The sharp corner acts in the same way as described above for the inner slots. Finally, the flow exhausts into freestream. The airflow exiting the upper channels causes an external flow disturbance that creates shock waves on the outer cowling. These shock waves also help reduce the pressure differential between the plenum and the freestream and reduce the overall flow rate.

Figure 6B:
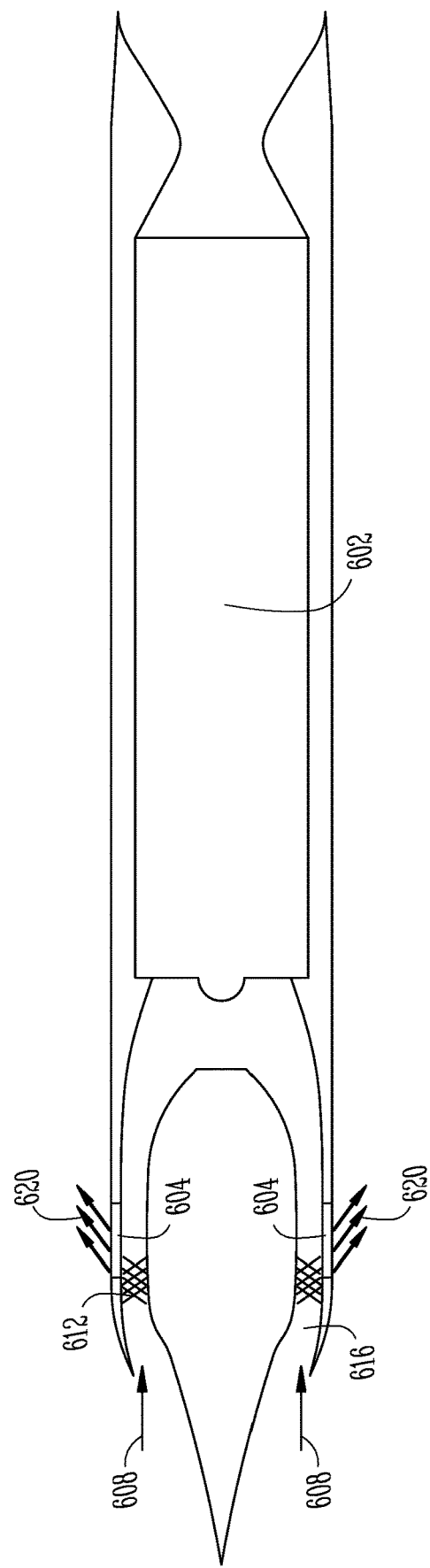

Referring now to FIG. 6A-6B, a flight vehicle 600 in which the only form of propulsion is an air-breathing engine 602 such as a gas turbine engine is provided with a passive bypass 604 formed in the cowling 606. As shown in FIG. 6A, during normal operation, supersonic airflow 608 into the inlet 610 produces a shock wave 612 that is established in the diffuser 614 aft of the passive bypass 604 such that an amount of airflow 608 that leaks out through the passive bypass is limited. As shown in FIG. 6B, if the shock wave 612 is disturbed and moves forward toward the throat 616, a portion 620 of airflow 608 entering the inlet is diverted through passive bypass 604 to the atmosphere to prevent the shock wave 612 from reaching and exiting through the throat 616.

While several illustrative embodiments of the disclosure have been shown and described, numerous variations and alternate embodiments will occur to those skilled in the art. Such variations and alternate embodiments are contemplated, and can be made without departing from the spirit and scope of the disclosure as defined in the appended claims.

I claim:

1. A passive bypass for an inlet to an air-breathing engine, said inlet defined as a void space between a flight vehicle body and a cowling, said inlet including a throat and a diffuser configured to supply airflow to the engine, said passive bypass comprising:
   a plurality of lower channels in the cowling and operatively coupled to the diffuser at an inner surface of the cowling and swept forward towards the throat;
   a plenum in the cowling operatively coupled to the plurality of lower openings; and
   a plurality of upper channels in the cowling and operatively coupled to the plenum and swept back away from the throat to an outer surface of the cowling,
   wherein a serpentine path through the plurality of lower openings, the plenum and the plurality of upper openings allows airflow in the inlet to exit through the cowling when the inlet supplies more airflow than the air-breathing engine demands.

2. The passive bypass of claim 1, wherein the inlet's void space is 2D or 3D.

3. The passive bypass of claim 1, wherein the inlet is unshrouded.

4. The passive bypass of claim 1, wherein the plurality of lower channels are swept forward at an angle greater than 90 degrees with respect to the airflow in the inlet.

5. The passive bypass of claim 1, wherein the plenum is configured to cause the airflow from the plurality of lower openings to decelerate and flow in a counter-clockwise direction.

6. The passive bypass of claim 1, wherein the plurality of upper channels are swept backward at an angle greater than 90 degrees with respect to the airflow in the inlet.

7. The passive bypass of claim 1, wherein the number of lower channels is less than the number of upper channels and the area of an individual lower channel is less than the area of an individual upper channel.

8. A passive bypass for an inlet to an air-breathing engine, said inlet defined as a void space between a flight vehicle body and a cowling, said inlet including a throat and a diffuser configured to supply airflow to the engine, said passive bypass comprising:
   a plurality of lower channels in the cowling and operatively coupled to the diffuser at an inner surface of the cowling and swept forward towards the throat;
   a plenum in the cowling operatively coupled to the plurality of lower openings; and
   a plurality of upper channels in the cowling and operatively coupled to the plenum and swept back away from the throat to an outer surface of the cowling;
   wherein when the air-breathing engine is off, supersonic airflow into the inlet produces a shock wave that is established in the diffuser, wherein all subsequent airflow entering the inlet is diverted forward through the lower openings into the plenum where the pressure is reduced and then directed aft out of the plurality of upper openings into the atmosphere,
   wherein when the air-breathing engine is on, a serpentine path through the plurality of lower openings, the plenum and the plurality of upper openings limits the amount of airflow that leaks out of the cowling.

9. The passive bypass of claim 8, further comprising:
   a flight vehicle that includes a booster engine configured to get the flight vehicle up to a supersonic speed at which the air-breathing engine is turned on.

10. The passive bypass of claim 9, further comprising:
    a combustion chamber that includes a booster propellant and an air-breathing propellant; and
    a port cover positioned aft of the inlet diffuser and at an opening to the combustion chamber;
    wherein the port cover is in a closed position to allow the booster propellant to combust and boost the flight vehicle up to speed,
    wherein once at speed the port cover is moved to an open position to allow supersonic airflow to flow through the opening into the combustion chamber to combust with the air-breathing propellant to increase the speed of the flight vehicle.

11. The passive bypass of claim 8, wherein the plurality of lower channels are swept forward at an angle greater than 90 degrees with respect to the airflow in the inlet.

12. The passive bypass of claim 8, wherein the plenum is configured to cause the airflow from the plurality of lower openings to decelerate and flow in a counter-clockwise direction.

13. The passive bypass of claim 8, wherein the plurality of upper channels are swept backward at an angle greater than 90 degrees with respect to the airflow in the inlet.

14. The passive bypass of claim 8, wherein the number of lower channels is less than the number of upper channels and the area of an individual lower channel is less than the area of an individual upper channel.

15. A passive bypass for an inlet to an air-breathing engine, said inlet defined as a void space between a flight vehicle body and a cowling, said inlet including a throat and a diffuser configured to supply airflow to the engine, said passive bypass comprising:
   a plurality of lower channels in the cowling and operatively coupled to the diffuser at an inner surface of the cowling and swept forward towards the throat;
   a plenum in the cowling operatively coupled to the plurality of lower openings; and
   a plurality of upper channels in the cowling and operatively coupled to the plenum and swept back away from the throat to an outer surface of the cowling;
   wherein when the air-breathing engine is on,
      during normal operation, supersonic airflow into the inlet produces a shock wave that is established in the diffuser aft of the passive bypass such that an amount of airflow that leaks out through the passive bypass is limited,
      wherein if the shock wave is disturbed and moves forward toward the throat, airflow entering the inlet is diverted forward through the lower openings into the plenum where the pressure is reduced and then directed aft out of the plurality of upper openings into the atmosphere to prevent the shock wave from reaching the throat.

16. The passive bypass of claim 15, further comprising:
a flight vehicle that includes only the air-breathing engine as a source of propulsion.

17. The passive bypass of claim 16, wherein the air-breathing engine is a gas turbine engine.

18. The passive bypass of claim 15, wherein the plurality of lower channels are swept forward at an angle greater than 90 degrees with respect to the airflow in the inlet, the plenum is configured to cause the airflow from the plurality of lower openings to decelerate and flow in a counter-clockwise direction, and the plurality of upper channels are swept backward at an angle greater than 90 degrees with respect to the airflow in the inlet.

19. The passive bypass of claim 15, wherein the number of lower channels is less than the number of upper channels and the area of an individual lower channel is less than the area of an individual upper channel.

\* \* \* \* \*

UNITED STATES PATENT AND TRADEMARK OFFICE
CERTIFICATE OF CORRECTION

| | | |
|---|---|---|
| PATENT NO. | : 12,221,925 B1 | Page 1 of 1 |
| APPLICATION NO. | : 18/635986 | |
| DATED | : February 11, 2025 | |
| INVENTOR(S) | : Timothy O'Brien | |

It is certified that error appears in the above-identified patent and that said Letters Patent is hereby corrected as shown below:

On the Title Page

Item (71), in "Applicant", in Column 1, Line 1, delete "Tewksbury, MA" and insert --Arlington, VA-- therefor In the Claims In Column 8, Line 55, in Claim 15, after "on,", delete a linebreak Signed and Sealed this
Sixteenth Day of December, 2025

John A. Squires
*Director of the United States Patent and Trademark Office*